United States Patent [19]

Jones

[11] 4,229,976

[45] Oct. 28, 1980

[54] CAPILLARY THERMOMETER CONTAINING VISIBLE SILICONE FLUID

[75] Inventor: James E. Jones, Saginaw, Mich.

[73] Assignee: Dow Corning Corporation, Midland, Mich.

[21] Appl. No.: 71,452

[22] Filed: Aug. 31, 1979

[51] Int. Cl.³ .............................................. G01K 5/12
[52] U.S. Cl. ...................................... 73/371; 73/368.2
[58] Field of Search ............................. 73/368.2, 371; 260/448.2 R

[56] References Cited

U.S. PATENT DOCUMENTS

| | | | |
|---|---|---|---|
| 2,491,843 | 12/1949 | Wilcock | 260/448.2 |
| 2,612,048 | 9/1952 | Zemany | 73/371 |
| 3,548,308 | 12/1970 | Seabury, Jr. | 73/371 X |

*Primary Examiner*—James J. Gill
*Attorney, Agent, or Firm*—George A. Grindahl

[57] ABSTRACT

An expanding-fluid thermometer of the capillary type is provided wherein the expanding fluid is a silicone fluid containing a coloring amount of 1,4-bis(alkylamino)-9,10-anthraquinone. The thermometer of this invention is useful over a wide temperature range and does not release toxic materials when broken. It thus has particular utility as a cooking thermometer.

6 Claims, No Drawings

CAPILLARY THERMOMETER CONTAINING VISIBLE SILICONE FLUID

BACKGROUND OF THE INVENTION

The present invention relates to an expanding-fluid type thermometer. More particularly this invention relates to a thermometer having a dyed silicone fluid as a visible expanding fluid.

Expanding-fluid type thermometers of the capillary-tube type are ancient and the variety of expanding fluids that have been used therein as the temperature-responsive means is broad. However, most expanding fluids suffer from one or more deficiencies that limits their use in a thermometer.

For example, a narrow liquid range is displayed by most fluids and therefore limits their use at high and/or low temperature. Alcohol, although useful at low temperature, is an example of a fluid that is not useful at high temperature because it boils. Mercury, although useful at high temperature, is an example of a fluid that is not useful at very low temperatures because it freezes.

Another deficiency of mercury is its toxicity. A broken mercury-type thermometer can release mercury into the environment, necessitating a clean-up of the released mercury. This deficiency is particularly important in the processing of food wherein the released mercury might enter the food being processed and/or the food-processing equipment.

Silicone fluids are well known to have a wide liquid range, good stability at high temperature and a very low toxicity and would appear to be ideally suited as a temperature-responsive means in an expanding-fluid type thermometer. However, silicone fluids are colorless and are nearly impossible to see in a capillary tube, thus making it difficult for the human eye to locate the meniscus of the capillary fluid. Furthermore, most dyes have limited solubility in silicone fluids and do not contribute sufficient color to a capillary column of silicone fluid.

SUMMARY OF THE INVENTION

It is an object of this invention to provide a thermometer of the expanding-fluid type wherein the expanding fluid is a suitably dyed silicone fluid. It is also an object of this invention to provide a mercury-free thermometer of the expanding-fluid type. It is a further object of this invention to provide a mercury-free thermometer suitable for use in a food oven.

The foregoing objects, and others, are achieved by using a specially dyed silicone fluid as the expanding fluid in a capillary type thermometer. It has been discovered that 1,4-bis(alkylamino)-9,10-anthraquinone has unusual solubility in silicone fluids, in that it readily dissolves in the silicone fluid without the need for heating or extensive stirring of the fluid or dissolving the dye in a cosolvent, and imparts an intense color to a capillary thread of the silicone fluid.

The thermometer of the present invention has the special utility of being suitable for use in food processing such as a food-processing oven, particularly a home oven, with substantially no health risk due to the release of toxic materials after breaking of the thermometer.

DETAILED DESCRIPTION OF THE INVENTION

The present invention relates to a thermometer comprising a transparent capillary tube portion which is closed at one end and which has a reservoir portion at the other end, said reservoir portion being in fluid communication with said transparent capillary tube portion, and an expanding fluid contained therein in sufficient amount to fill said reservoir portion and to provide a meniscus of said fluid in said transparent capillary tube portion at the intended temperature of use of said thermometer, said fluid consisting essentially of a silicone fluid having dissolved therein an amount of 1,4-bis(alkylamino)-9,10-anthraquinone sufficient to provide a color to said silicone fluid in said transparent capillary tube portion.

The expanding fluid thermometer of this invention has a conventional shape in that it comprises a transparent capillary tube portion which is closed at one end and has a reservoir portion attached at the other end and which is in fluid communication with the capillary bore of the capillary tube portion.

To operate the thermometer at least the reservoir portion of the thermometer is exposed to an environment whose temperature is to be measured thereby equilizing the temperature of the expanding fluid contained therein with the temperature of the environment, and determining the position of the fluid meniscus in the transparent capillary tube portion.

In a preferred embodiment of this invention the thermometer is constructed of glass with the reservoir portion fused to one end of the transparent capillary tube portion, the other end of which is closed by fusing. Such a thermometer has a useful range limited only by the thermal stability of the silicone fluid.

The transparent capillary tube portion is typically an elongated rod having a simple cross-section, such as circular, elliptical or triangular and a capillary bore contained therein. The length of the capillary tube portion is much larger, such as from 10 to 100 times larger, than the longest dimension of its cross section.

The capillary bore of the transparent capillary tube portion typically has a circular cross-section and extends from the reservoir portion at one end to the closed portion at the other end of the capillary tube portion. The capillary tube portion may contain an overflow chamber at its closed end in the well-known manner. The cross-section area of the capillary bore is typically much smaller, such as from 10 to 100 times smaller, than the cross-section area of the capillary tube portion.

The reservoir portion is typically of relatively thin-wall construction to facilitate the transfer of heat between expanding fluid in the thermometer and the thermal environment being measured.

The shape of the reservoir portion is not critical and may be spherical, cylindrical, etc.

The volume of the reservoir portion is typically larger, and preferably much larger, than the volume of the capillary of the capillary tube portion.

The relative sizes of the capillary bore cross section, the capillary bore length and the reservoir volume may be determined from the coefficient of thermal expansion of the expanding fluid and the desired operating temperature range of the thermometer in the convention manner.

The thermometer may comprise a temperature indicating scale, fixedly or movably attached to the transparent capillary tube portion, although this is not required for the useful functioning of the thermometer of this invention.

The essence of the present invention is the use of a suitably dyed silicone fluid as the thermally responsive expanding fluid in an otherwise conventional thermometer.

The dyed silicone fluid is prepared by simply mixing 1,4-bis(alkylamino)-9,10-anthraquinone with a silicone fluid of suitable viscosity.

Although only one dye has been used in the thermometer of this invention, it is believed that any 1,4-bis(alkylamino)-9,10-anthraquinone would be equally useful herein.

1,4-Bis(alkylamino)-9,10-anthraquinones have the formula

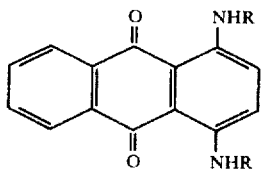

wherein each R denotes, independently, any alkyl radical. Practical considerations favor those compounds of the above formula wherein R is an alkyl radical having from 1 to 8 carbon atoms, such as methyl, ethyl, propyl, isopropyl, butyl, isobutyl, secondary butyl, pentyl, hexyl, 2-ethylhexyl and octyl.

The R radicals may be identical or different, if desired. For example, in the above formula, one R may be methyl and the other R may be butyl. In addition, the dye may be a mixture of 1,4-bis(alkylamino)-9,10-anthraquinones such as a mixture of compounds of the above formula wherein both R radicals are methyl, both R radicals are butyl and one R radical is methyl and the other R radical is butyl.

1,4-Bis(alkylamino)-9,10-anthraquinones may be synthesized by reducing 1,4-dihydroxy-9,10-anthraquinone to leuco-1,4-dihydroxy-9,10-anthraquinone, then reacting this leuco-dihydroxy product with the appropriate alkyl amine or mixture of alkyl amines to yield leuco-1,4-bis(alkylamino)-9,10-anthraquinone which is subsequently oxidized to the desired 1,4-bis(alkylamino)-9,10-anthraquinone. Alternately, 1,4-diamino-9,10-anthraquinone may be used to prepare 1,4-bis(alkylamino)-9,10-anthraquinones.

A dye that is admirably operable in the thermometer of this invention is Amaplast® Blue RJK which was obtained from American Color and Chemical Corporation. Amplast® Blue RJK is a mixture of 1,4-bis(alkylamino)-9,10-anthraquinones wherein the alkyl radicals are methyl and butyl, a major portion of the mixture being 1-methylamino-4-butylamino-9,10-anthraquinone.

Silicone fluids which are used in the thermometer of this invention should be substantially non-volatile, but readily flowable, in the operative temperature range of the thermometer. Silicone fluids having a viscosity of from 5 to 50 millipascal-seconds at 25° C. are preferred for use in common temperature applications. Silicone fluids having a viscosity of less than 5 millipascal-seconds at 25° C. may be excessively volatile above 200° C. to be useful whereas silicone fluids having a viscosity of greater than 50 millipascal-seconds at 25° C. may be excessively viscous below −40° C. to be useful.

A preferred silicone fluid for the purposes of this invention is a trimethylsiloxane-endblocked polydimethylsiloxane having the average formula Me₃SiO(Me₂SiO)$_x$SiMe₃ wherein Me denotes the methyl radical and x has an average value sufficient to provide the desired viscosity for the fluid. To obtain a silicone fluid of the above formula having a viscosity of from 1 to 100 millipascal-seconds x shall have an average value of from approximately 1.3 to 67.9. A viscosity in the preferred range of 5 to 50 millipascal-seconds is obtained when x has an average value of from approximately 8.2 to 43.7.

The silicone fluid may be composed of only one type of silicone molecular species or a mixture of silicone molecular species as long as the desired viscosity is obtained. For ease of synthesis it is preferred that the silicone fluid is a mixture of silicone molecular species, such as a mixture of trimethyl-endblocked polydimethylsiloxane molecules having various values of x, each species taken in suitable amounts so that the viscosity of the mixture has a value of from 1 to 100, preferably 5 to 50 millipascal-seconds at 25° C.

Silicone fluids are well known in the polymer art; many are readily available, either commercially or by simple chemical synthesis. Silicone fluids are available in various grades such as medical grade, food grade and industrial grade.

Silicone fluids having the above formula are commercially available from many suppliers, such as Dow Corning Corporation, General Electric Co., Stauffer-Wacker Silicones and Union Carbide Corporation.

Silicone fluids having the above formula may be readily synthesized by heating a mixture of suitable amounts of Me₃SiOSiMe₃, and (Me₂SiO)₄ and a trace of an alkaline catalyst, such as NaOH, until molecular equilibrium has been obtained and thereafter neutralizing the catalyst.

The silicone fluid may contain small amounts of thermal stability additives to minimize or eliminate any molecular change that the silicone fluid may experience by continued exposure to very high temperatures.

To further describe, but not limit, the invention the following example is provided.

A silicone fluid having the formula Me₃SiO(Me₂SiO)$_{14.3}$SiMe₃ and a viscosity at 25° C. of 10 millipascal-seconds and a coefficient of expansion of 0.00108 cm³/cm³/°C. was saturated with Amaplast® Blue RJK (predominantly 1-methylamino-4-butylamino-9,10-anthraquinone) at room temperature by mixing the fluid with an excess of the dye and filtering the saturated dyed fluid to remove the undissolved dye.

A glass alcohol type thermometer, useful in the temperature range of −100° C. to +50° C., was broken open at the end opposite the reservoir portion, its alcohol fluid was removed and a sufficient amount of the above-prepared blue silicone fluid was introduced so that 22° C. was denoted by the 7° C. reading on the capillary tube portion of the thermometer. The meniscus could be readily seen. When the reservoir portion of the thermometer was held in the hand the position of the meniscus increased to the 17° C. reading. When the thermometer was cooled to −40° C. the meniscus was located at the −56° C. marking on the capillary portion. Note that this dyed silicone fluid has substantially the same thermal response in this thermometer as did the alcohol.

That which is claimed is:

1. A thermometer comprising a transparent capillary tube portion which is closed at one end and which has a reservoir portion at the other end, said reservoir portion being in fluid communication with said transparent capillary portion, and an expanding fluid contained therein in sufficient amount to fill said reservoir portion and the provide a meniscus of said fluid in said transparent capillary tube portion at the intended temperature of use of said thermometer, said fluid consisting essentially of a silicone fluid having dissolved therein an amount of 1,4-bis(alkylamino)-9,10-anthraquinone sufficient to provide a color to said silicone fluid in said transparent capillary tube portion.

2. A thermometer according to claim 1 further comprising a temperature indicating scale fixedly or movably attached to said transparent capillary tube portion.

3. A thermometer according to claim 1 wherein said transparent capillary tube portion and said reservoir portion is glass.

4. A thermometer according to claims 1, 2 or 3 wherein said silicone fluid is a polydimethylsiloxane fluid having a viscosity of from 5 to 50 millipascal-seconds at 25° C.

5. A thermometer according to claim 4 wherein the polydimethylsiloxane liquid has a viscosity of approximately 10 millipascal-seconds at 25° C.

6. A thermometer according to claim 1 wherein the alkyl radicals of the 1,4-bis-(alkylamino)-9,10-anthraquinone are methyl and butyl.

* * * * *